(12) United States Patent
Jang

(10) Patent No.: US 10,984,512 B2
(45) Date of Patent: Apr. 20, 2021

(54) METHOD OF PROVIDING AUTOMOTIVE AROUND VIEW IMAGE USING MACHINE LEARNING MODEL

(71) Applicant: Hyun-Min Jang, Seoul (KR)

(72) Inventor: Hyun-Min Jang, Seoul (KR)

(*) Notice: Subject to any disclaimer, the term of this patent is extended or adjusted under 35 U.S.C. 154(b) by 71 days.

(21) Appl. No.: 16/460,474

(22) Filed: Jul. 2, 2019

(65) Prior Publication Data
US 2020/0013154 A1 Jan. 9, 2020

(30) Foreign Application Priority Data

Jul. 9, 2018 (KR) .................. 10-2018-0079432

(51) Int. Cl.
| | | |
|---|---|---|
| *G06K 9/40* | (2006.01) | |
| *G06T 5/50* | (2006.01) | |
| *G06T 7/73* | (2017.01) | |
| *G06T 7/00* | (2017.01) | |
| *B60R 1/00* | (2006.01) | |

(52) U.S. Cl.
CPC .................. *G06T 5/50* (2013.01); *B60R 1/00* (2013.01); *G06T 7/73* (2017.01); *G06T 7/97* (2017.01); *B60R 2300/105* (2013.01); *B60R 2300/30* (2013.01); *G06T 2207/20081* (2013.01); *G06T 2207/20084* (2013.01); *G06T 2207/30252* (2013.01)

(58) Field of Classification Search
CPC ........ G06N 20/00; G06N 20/10; G06N 20/20; G06T 7/20; G06T 7/579; G06T 7/50; G06T 5/005; G06T 5/50; G06T 7/0069; G06T 7/751; G06K 9/6267; G06K 9/3233; H04N 13/117; H04N 19/553; H04N 13/00; H04N 19/00
See application file for complete search history.

(56) References Cited

U.S. PATENT DOCUMENTS

| | | | |
|---|---|---|---|
| 2017/0308734 A1* | 10/2017 | Chalom ............... | G06K 9/6267 |
| 2018/0268548 A1* | 9/2018 | Lin ....................... | G06N 3/084 |
| 2019/0147234 A1* | 5/2019 | Kicanaoglu ........ | G06K 9/00214 382/218 |
| 2019/0147250 A1* | 5/2019 | Zhang .................. | G06T 3/0031 382/224 |

FOREIGN PATENT DOCUMENTS

| | | |
|---|---|---|
| KR | 10-2016-0053612 A | 5/2016 |
| KR | 10-2017-0026750 A | 3/2017 |

* cited by examiner

*Primary Examiner* — Duy M Dang
(74) *Attorney, Agent, or Firm* — Dentons US LLP

(57) ABSTRACT

Provided is an automotive around view image providing method using a machine learning model. The method includes: receiving, by an image processing device, a plurality of images obtained by a plurality of cameras mounted on a car; inputting, by the image processing device, the plurality of images to a neural network encoder to generate a feature vector for each of the plurality of images; and combining, by the image processing device, feature vectors for the plurality of images into one image form and inputting the one image form to the neural network decoder to generate a matched one image. The neural network decoder includes a filter for performing matching on adjacent images having an overlapping area among the plurality of images based on the feature vector for the plurality of images.

15 Claims, 14 Drawing Sheets

METHOD OF PROVIDING AUTOMOTIVE AROUND VIEW IMAGE USING MACHINE LEARNING MODEL

BACKGROUND

The present invention relates to a technique for providing an around view image to a car.

An around view monitoring system (AVM) is a system that receives images from a plurality of cameras (usually front, rear, left, and right) installed at a car and displays the surroundings of the car in a top view form.

Generally, in the car production process, an operation of correcting mismatching according to the camera position and the like is performed. However, an around view image provided by a plurality of cameras has a sense of difference as compared to human vision. Furthermore, depending on the physical changes that occur during the operation (such as the distortion of the camera, the viewing angle change of the camera due to impact, and the like) while using the car, additional distortion may occur in the around view image.

SUMMARY

The present invention is to provide a matched around view image using a machine learning model such as an artificial neural network.

According to the present invention, an automotive around view image providing method using a machine learning model includes: receiving, by an image processing device, a plurality of images obtained by a plurality of cameras mounted on a car; inputting, by the image processing device, the plurality of images to a neural network encoder to generate a feature vector for each of the plurality of images; and combining, by the image processing device, feature vectors for the plurality of images into one image form and inputting the one image form to the neural network decoder to generate a matched one image. The neural network decoder includes a filter for performing matching on adjacent images having an overlapping area among the plurality of images based on the feature vector for the plurality of images.

According to the present invention, an image processing device for generating an around view image using a machine learning model includes: a communication device configured to receive a plurality of images obtained by a plurality of cameras mounted on a car; a memory configured to store an image generation network model including a convolutional encoder and a convolutional decoder; and a processor configured to input the plurality of images to the convolutional encoder to generate a feature vector for each of the plurality of images, and configured to input the feature vector for the plurality of images to the convolutional decoder to generate one image.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

The techniques described below may perform various modifications and may have various embodiments, and thus certain embodiments are illustrated and described in detail with reference to the drawings. However, this does not limit various embodiments of the inventive concept to a specific embodiment and it should be understood that the inventive concept covers all the modifications, equivalents, and/or replacements of this disclosure provided they come within the scope of the appended claims and their equivalents.

The terms "first", "second", "A", "B", etc. may be used to describe various components, but the corresponding components are not limited by the terms, and the terms are used solely for the purpose of distinguishing one component from another. For example, a first component may be referred to as a second component and vice versa without departing from the scope of the inventive concept. The term "and/or" includes a combination or any one of a plurality of listed items.

It is to be understood that the singular expression in the terms used in this specification includes plural expression unless the terms are clearly different in the context, and the term "include," "comprise," "including," or "comprising," specifies a property, a region, a fixed number, a step, a process, an element and/or a component but does not exclude other properties, regions, fixed numbers, steps, processes, elements and/or components.

Prior to detailed description of the drawings, it is to be clarified that the division of components in this specification is merely a division by main functions of each component. In other words, two or more constituent parts to be described below may be combined into one constituent part, or one constituent part may be divided into two or more according to functions that are more subdivided. In addition, it is apparent that each of the constituent parts described below may additionally perform some or all of the functions of other constituent parts in addition to the main function of itself, and some of the main functions for which each of the constituent parts is responsible for may be performed entirely by the other constituent parts.

In addition, in performing the method or the operating method, each of the steps of the method may take place differently from the stated order unless clearly specified in the context. That is, each process may occur in the same order as described, may be performed substantially concurrently, or may be performed in the opposite order.

Figure 1:
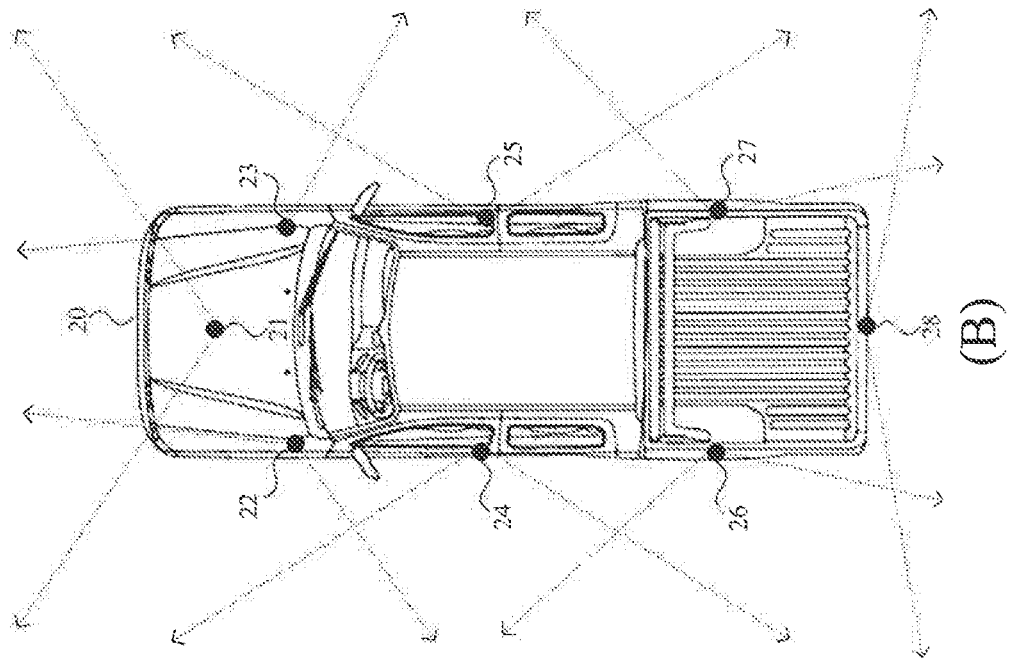
FIG. 1 is an example of a camera placed in a car.
Figure 1:
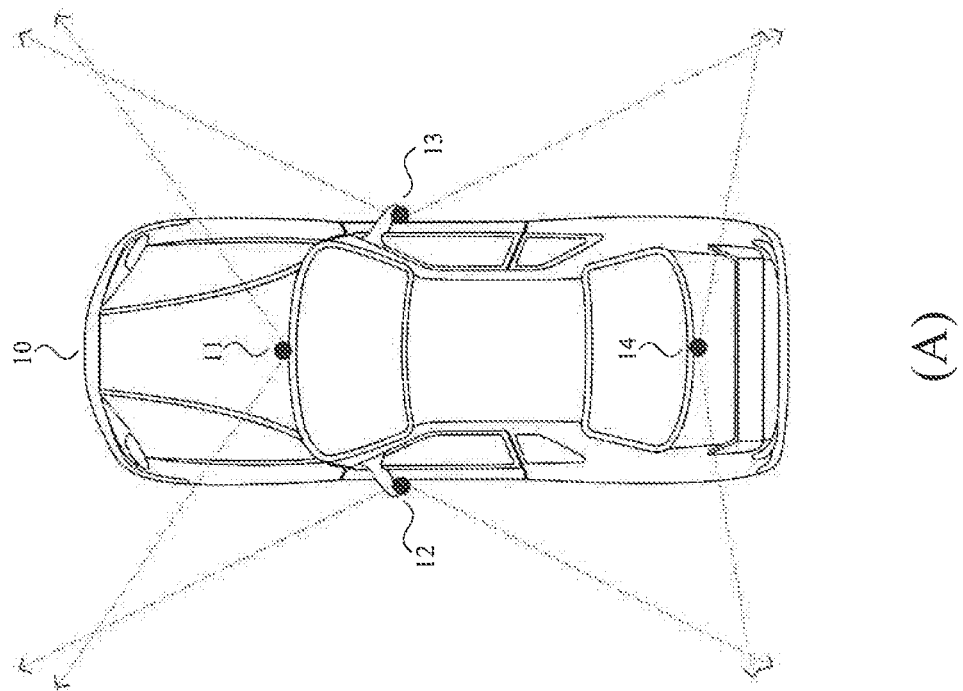

The technique described below relates to a technique for generating an around view image provided in a car. FIG. 1 is an example of a camera placed in a car. FIG. 1(A) shows an example of a car 10 in which four cameras 11, 12, 13 and 14 are arranged for an around view image. The four cameras are generally disposed in the front 11, the left 12, the right 13, and the rear 14. Adjacent cameras have overlapping angles of view. However, when four cameras are normally used, some shadow areas (areas not photographed) occur. Especially for large vehicles (buses, trucks, etc.), there may be more shaded areas. FIG. 1(B) shows an example of a car 20 in which eight cameras 21 to 28 are arranged for an around view image. When using 8 cameras (8 channels), all the 360 degree surround images may be obtained without shadow areas.

When the number of cameras is increased as shown in FIG. 1(B), it takes a long time to correct the image manually through the manufacturing process. Of course, even when four cameras are used as shown in FIG. 1(A), it is important to match the images obtained by each camera and synthesize them into one image.

Figure 2:
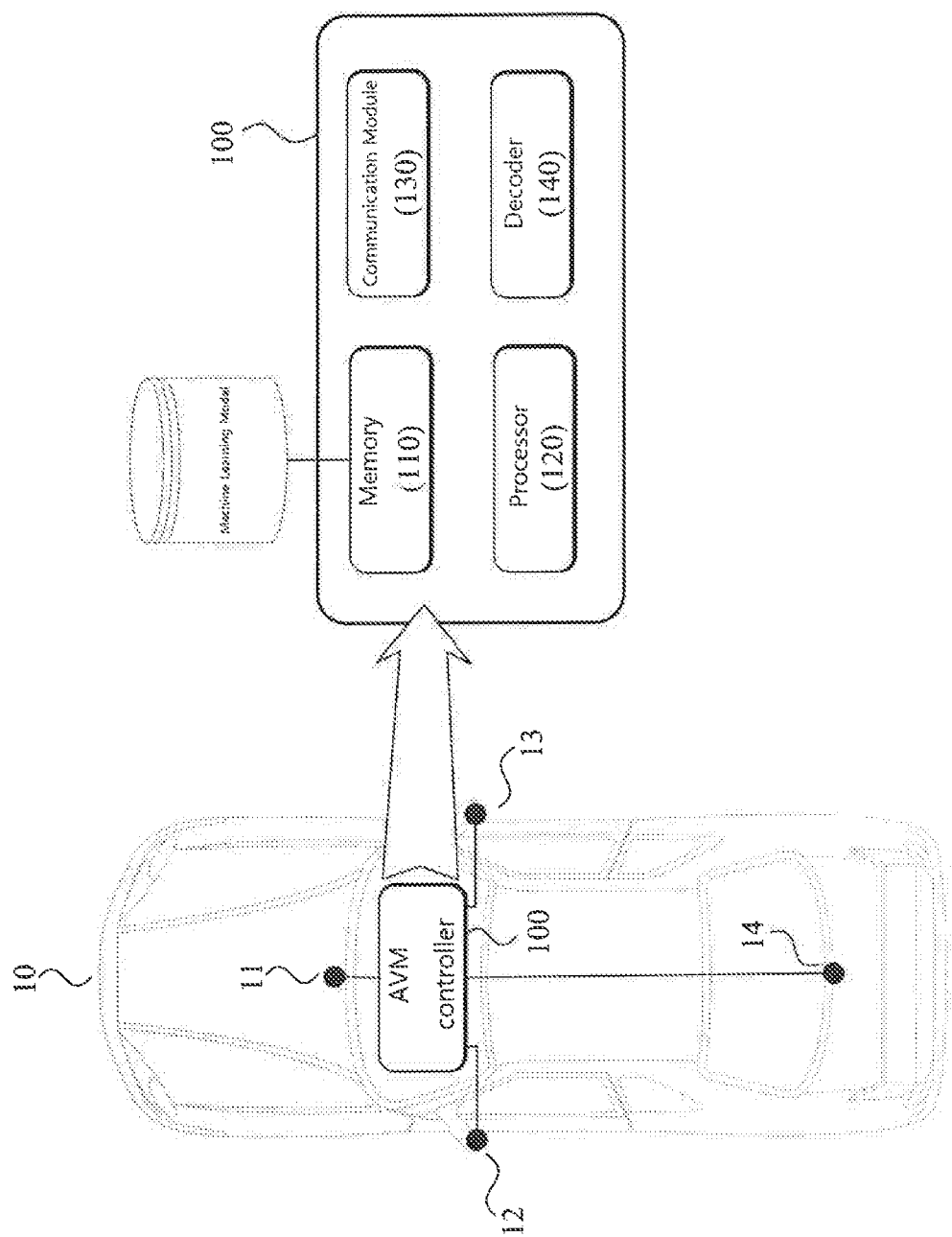
FIG. 2 is an example of a controller for controlling the car around view.

FIG. 2 is an example of a controller for controlling the car around view. The left side of FIG. 2 shows the car shown in FIG. 1(A) as an example. The car includes four cameras 11 to 14. The AVM controller 100 processes the images obtained by the four cameras 11 to 14 and synthesizes them into one image to generate an around view image. The AVM controller 100 is a kind of image processing device. The AVM controller 100 may be implemented as a separate device.

The right side of FIG. 2 is an example showing a configuration for the AVM controller 100. The AVM controller 100 includes a memory 110, a processor 120, a communication module 130, and a decoder 140. The decoder 140 decodes the image data transmitted by the cameras 11 to 14 through the car internal communication. Although FIG. 2 illustrates the decoder 140 as a separate structure, the processor 120 that drives a program for decoding may perform the function of the decoder 140.

The communication module 130 is a communication device that receives or transmits data and commands through car internal communication. Further, the communication module 130 may include a communication device that performs wireless communication (e.g., Wi-Fi).

The memory 110 may store image data transmitted by the cameras 11 to 14. The memory 110 may store a model for image matching or around view generation. The memory 110 may store a certain machine learning model to be described later.

The processor 120 is an operation device capable of processing image data. The processor 120 may be an Electronic Control Unit (ECU) located in the car. Alternatively, the processor 120 may be a dedicated operation device (such as CPU, AP, etc.) for around view processing. The processor 120 may input images to the machine learning model stored in the memory 110 to match the plurality of images and generate an around view image. The process of matching the images and generating an around view image will be described later.

FIG. 2 is a block diagram illustrating the configuration of the AVM controller 100. The AVM controller 100 may be implemented using logic elements such as analog circuits, digital circuits, or Field Programmable Gate Arrays (FPGAs).

The technique described below uses a machine learning model for image processing. As widely known, there are various models for machine learning models. For convenience of explanation, the following description assumes that an image is generated using an artificial neural network. The artificial neural network includes a Convolutional Neural Network (CNN), an auto encoder, a convolutional encoder/decoder, and a Recurrent Neural Network (RNN). A CNN, which is widely used for image processing, among artificial neural networks, is briefly described.

Convolutional Neural Network (CNN)

The CNN is a network including several layers consisting of a convolutional layer and a pooling layer. The CNN is one of the models that implement the deep learning network. The input image is filtered through the convolutional layer and the feature map is extracted as a result. The feature map is used as the input of the next layer and is continuously processed by each layer. A learned network first responds to simple components in an image, such as an edge, and as the layer is deeper, it learns features that respond to texture and object parts. Recently, the CNN is being developed as gradually adding the depth of layers such as AlexNet, VGG16, ResiNet, and so on. The layer constituting the CNN will be briefly described.

Figure 3:
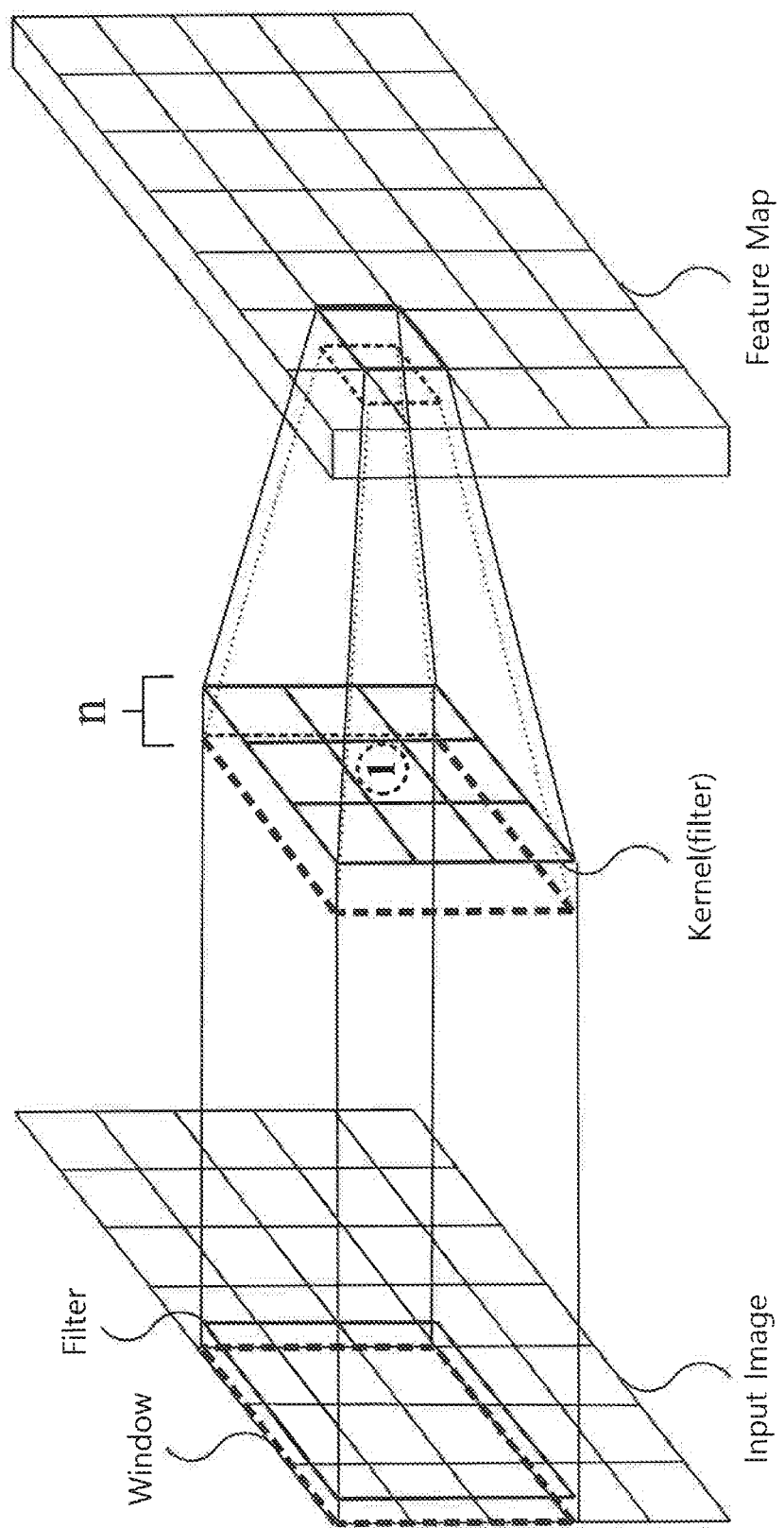
FIG. 3 is an example of a convolutional layer.

FIG. 3 is an example of a convolutional layer. FIG. 3 shows the operation of a convolutional layer. The convolutional layer outputs the feature map through the convolution operation on the input image. At this time, a filter that performs a convolution operation is called a kernel. The size of the filter is called the filter size or kernel size. The operation parameters constituting the kernel are called kernel parameters, filter parameters, or weights. In the convolutional layer, different types of filters may be used on one input. In FIG. 1, the number of filters is denoted by n. Here, n is a natural number. At this time, the process by which one filter processes the input is referred to as a convolution channel.

FIG. 1 corresponds to a process of performing a convolution operation with a filter having a kernel size of 3×3 in one channel. The convolutional layer performs a convolution operation on a specific area of the input image. In FIG. 3, an area indicated by a dotted rectangle is the object of convolution operation. The operation area is called a window. The window can be moved from the upper left corner to the lower right corner of the image one by one, and the movement size that moves at one time can be adjusted. The movement size is called stride. The convolutional layer performs a convolution operation on all areas of the input image while moving the window in the input image. On the other hand, the convolutional layer maintains the dimension of the input image after the convolution operation by padding the edge of the image.

Figure 4:
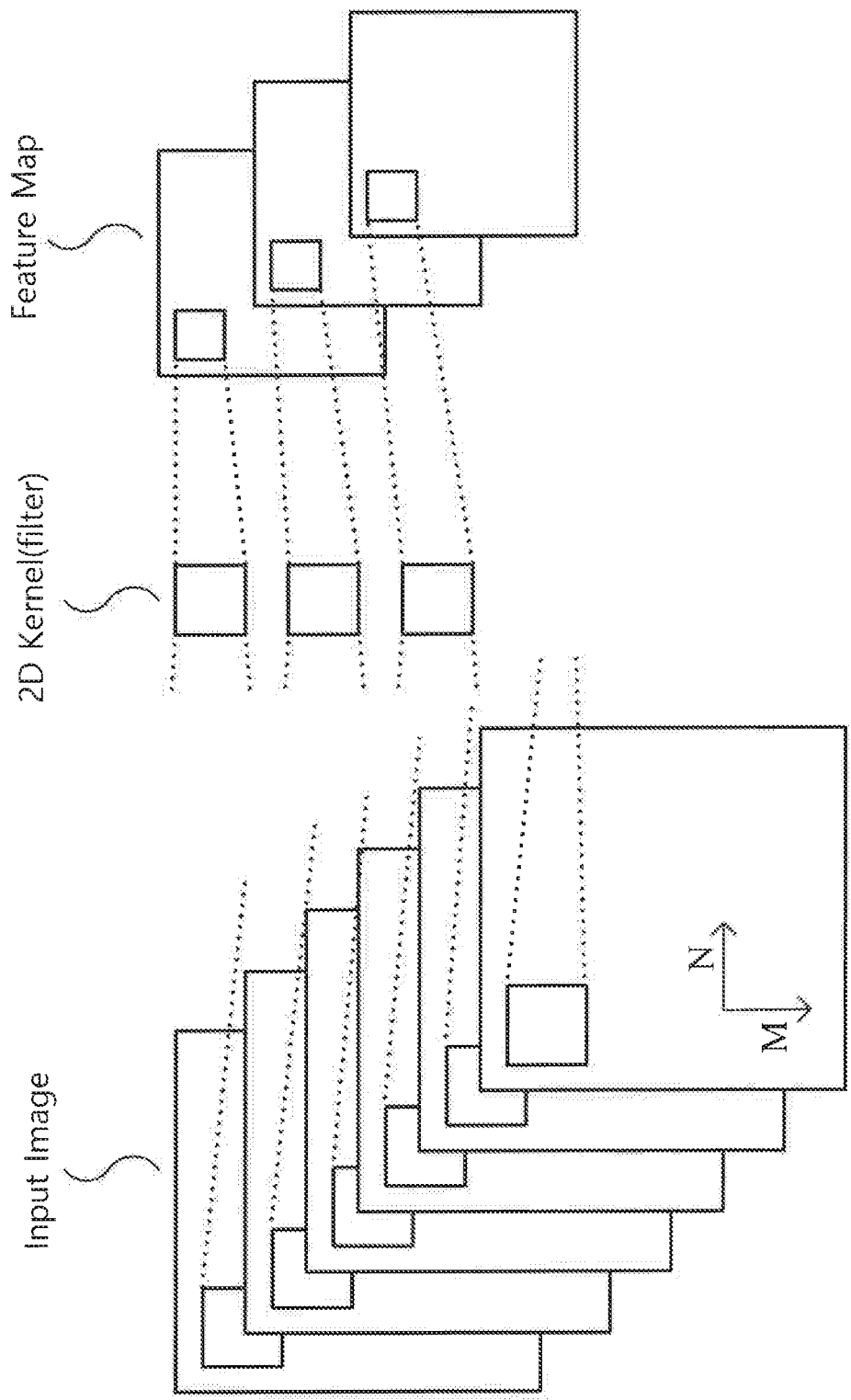
FIG. 4 is another example of 2D convolutional layer.
Figure 5:
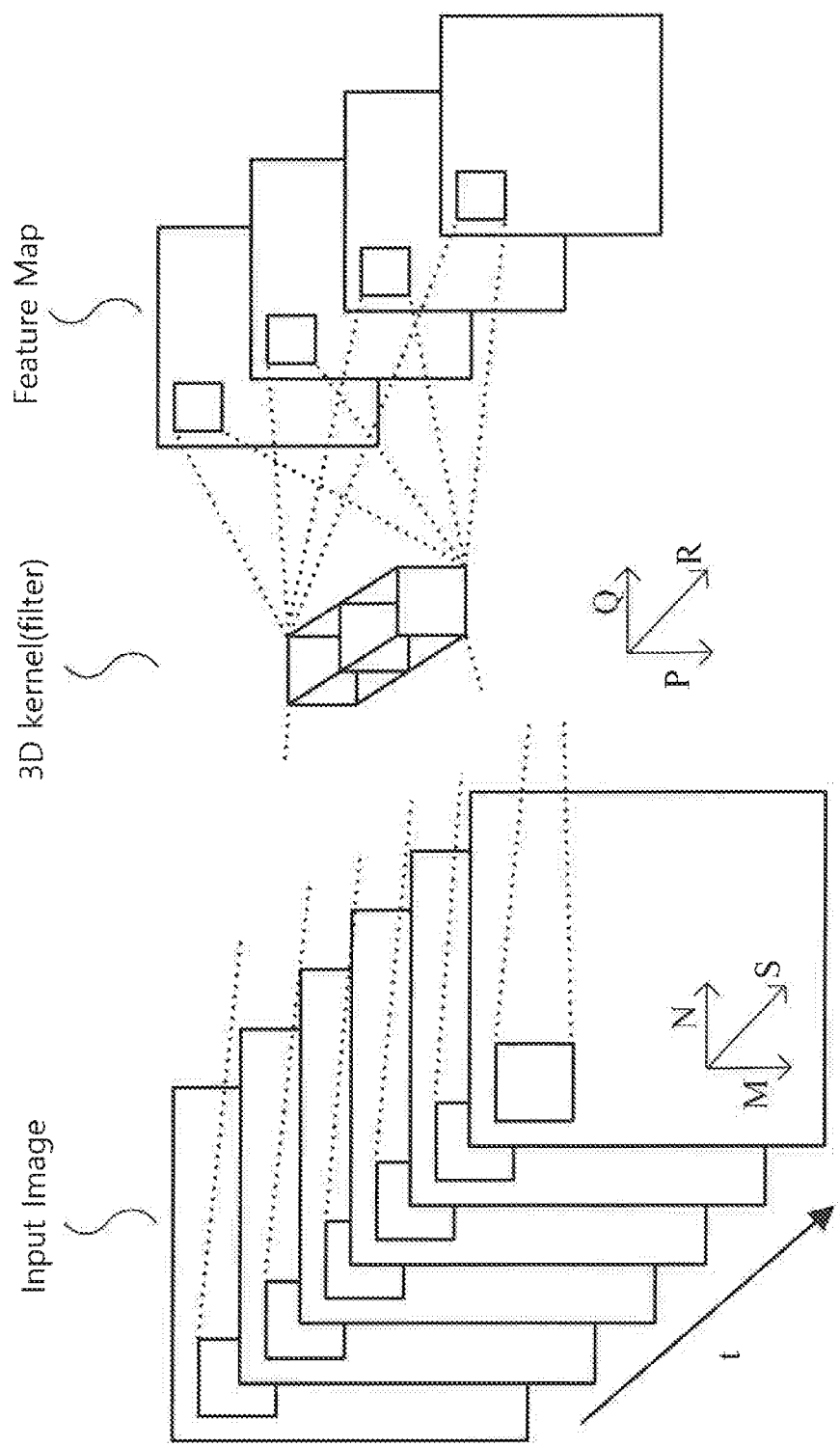
FIG. 5 is another example of 3D convolutional layer.

FIG. 4 and FIG. 5 are another example of a convolutional layer. A typical convolution operation means 2D. FIG. 4 shows an example of a 2D convolutional layer. Even if the 2D convolutional layer is applied to a plurality of images, one filter outputs one feature map. In FIG. 4, M and N denote the horizontal and vertical directions of the image, respectively.

The 3D convolution operation can model temporal information. FIG. 5 shows an example of a 3D convolutional layer. The 3D convolutional layer preserves information t on the time axis, and the filter outputs all feature maps. The 3D kernel extracts features for the area located in the window for a plurality of consecutive frames (images) on the time axis. In FIG. 5, M, N, and S represent the horizontal, vertical, and number of input frames of the image, respectively. In addition, P, Q, and R represent the horizontal, vertical, and number of dimensions of the filter, respectively.

Figure 6:
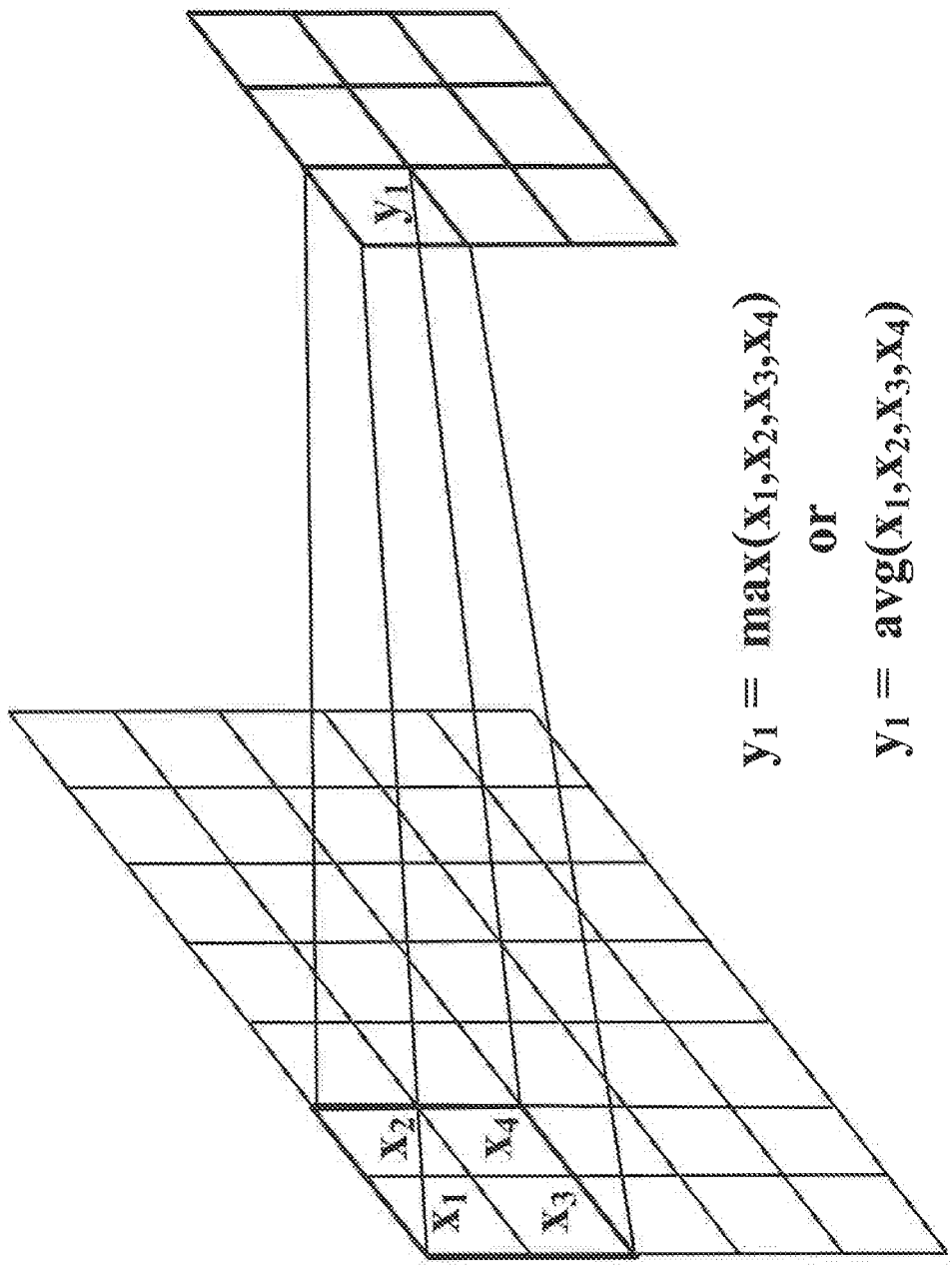
FIG. 6 is an example of a pooling layer.

The process of sub-sampling the feature map obtained as a result of operation in the convolutional layer is called pooling (pooling layer). FIG. 6 is an example of a pooling layer. In FIG. 6, the pooling layer selects one sample in a 2×2 window so that the horizontal and vertical output thereof is half the input. Pooling allows a stride and a window to have the same size in general. FIG. 6 shows an example in which both the stride and the window size are set to 2. The pooling operations include max pooling and average pooling. The max pooling selects the largest sample value in the window. The average pooling is sampled with the average value of the values included in the window.

A nonlinear operation layer is a layer that determines the output value at a neuron (node). The nonlinear operation layer uses a transfer function. The transfer functions include Relu and sigmoid functions.

The AVM controller described above can generate an around view image using an artificial neural network. However, for convenience of explanation, the object that generates the around view image is called an image processing device. An image processing device is an operation device capable of processing image data constantly. The image processing device is meant to include forms such as PC, server, ECU inside the car, AVM controller, and so on.

Figure 7:
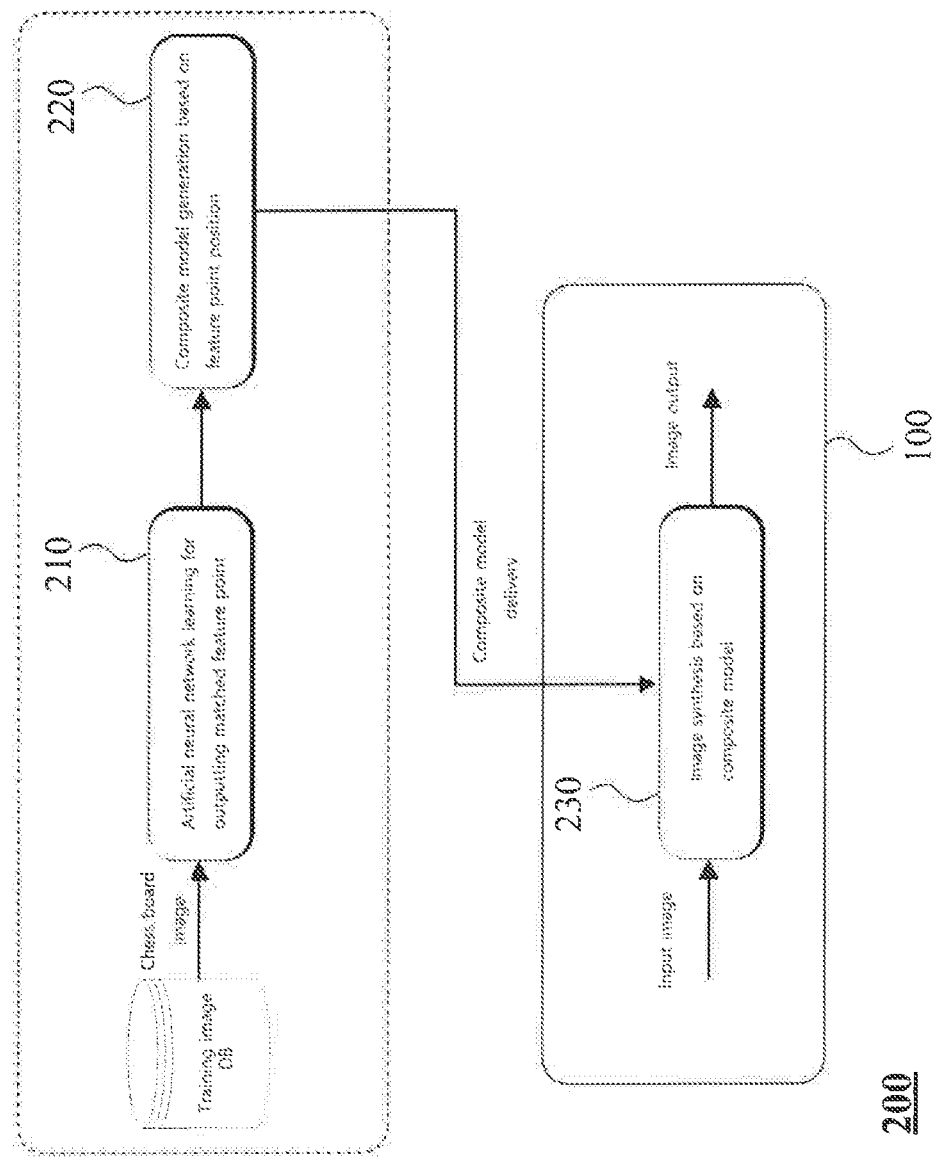
FIG. 7 is an example of a process for providing an around view image.

FIG. 7 is an example of a process 200 for providing an around view image. In FIG. 7, a dotted box is a process of generating a model involved in the generation of an around view image. The process of generating a model can be performed by a separate computer device. A computer device means a device such as a PC, a server, and the like. It is assumed that the computer device generates a model. It is also assumed that an image processing device generates an around view image in a car using a generated model.

A training image DB stores training images for model generation. The training image includes images obtained by a plurality of cameras arranged in a car. In FIG. 7, it is assumed that the training image is an image including a chess board. The computer device inputs images obtained by a plurality of cameras to an artificial neural network. The computer device learns that the artificial neural network outputs feature vectors (feature points) of each image using the training image (210). In this case, the artificial neural network may be CNN. An artificial neural network may exist separately (in parallel) for a plurality of images. Alternatively, the artificial neural network may be learned to output feature vectors that match each other in a plurality of images (210). The computer device can regularly match captured images of adjacent areas among a plurality of images based on feature vectors matching each other in a plurality of images (images of adjacent areas usually include overlapping areas). Through this, it is possible to identify the points that are overlapped with each other in the currently inputted image, and the computer device can generate a model for synthesizing adjacent images into one image based on the position of the feature point (220). In this case, a composite model is generated based on a specific coordinate in the obtained image.

The image processing device synthesizes the images captured by the cameras located in the car into a single image using the received composite model (230). Composite model transfer can be progressed through a separate network. Alternatively, an AVM controller with a composite model installed in the car manufacturing process may be assembled and delivered to the car.

Figure 8:
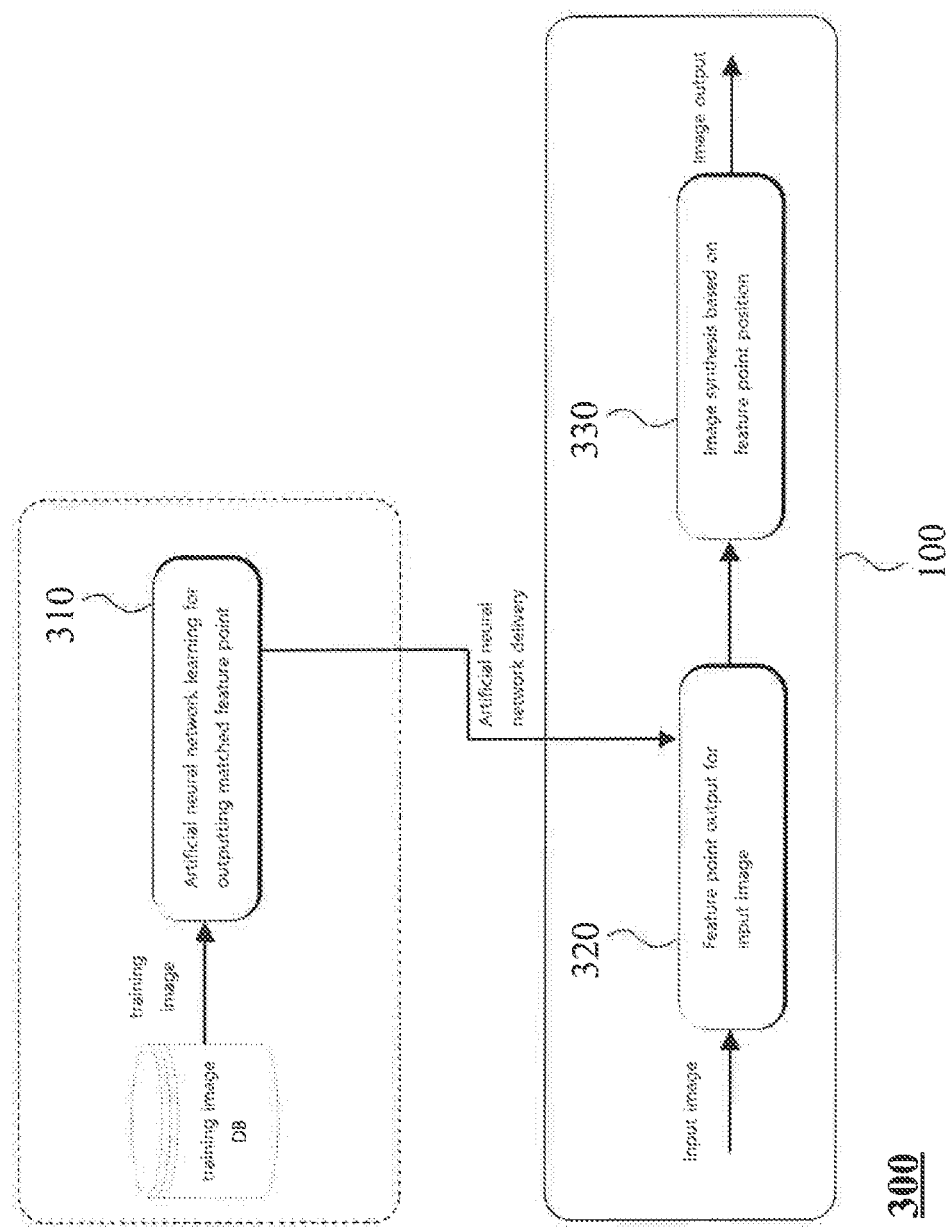
FIG. 8 is another example of a process for providing an around view image.

FIG. 8 is another example of a process 300 for providing an around view image. The computer device inputs the training image to the artificial neural network. At this time, the training image may be an image that does not include a chess board. That is, a training image similar to the car driving environment is used to find a feature point in the image itself. The computer device learns an artificial neural network to output feature points in the input image (310). Alternatively, the artificial neural network may be learned to output feature vectors that match each other in a plurality of images (310).

The image processing device receives an artificial neural network. The image processing device inputs images obtained by a plurality of cameras placed on a car into the artificial neural network. The artificial neural network outputs a feature vector (feature point) for the inputted image (320). At this time, the artificial neural network may exist separately for a plurality of images. The image processing device may find matched feature points in the adjacent images among the plurality of images based on the feature vectors of the plurality of images (330). The image processing device can use any one of a variety of algorithms for finding matched feature points in an image processing field. The image processing device can match images based on feature points matching each other in adjacent images. The matching may be referred to as a process of overlapping a plurality of images based on a matching portion. Of course, each camera can constantly map and change the images captured by each camera in order to display the images on the display screen. For example, the image processing device can perform a process of correcting distortion of an image taken with a fisheye lens in advance. In this case, the image processing device can extract the feature points by inputting the corrected image into the neural network. The image processing device generates a composite image based on the matched image (330).

Figure 9:
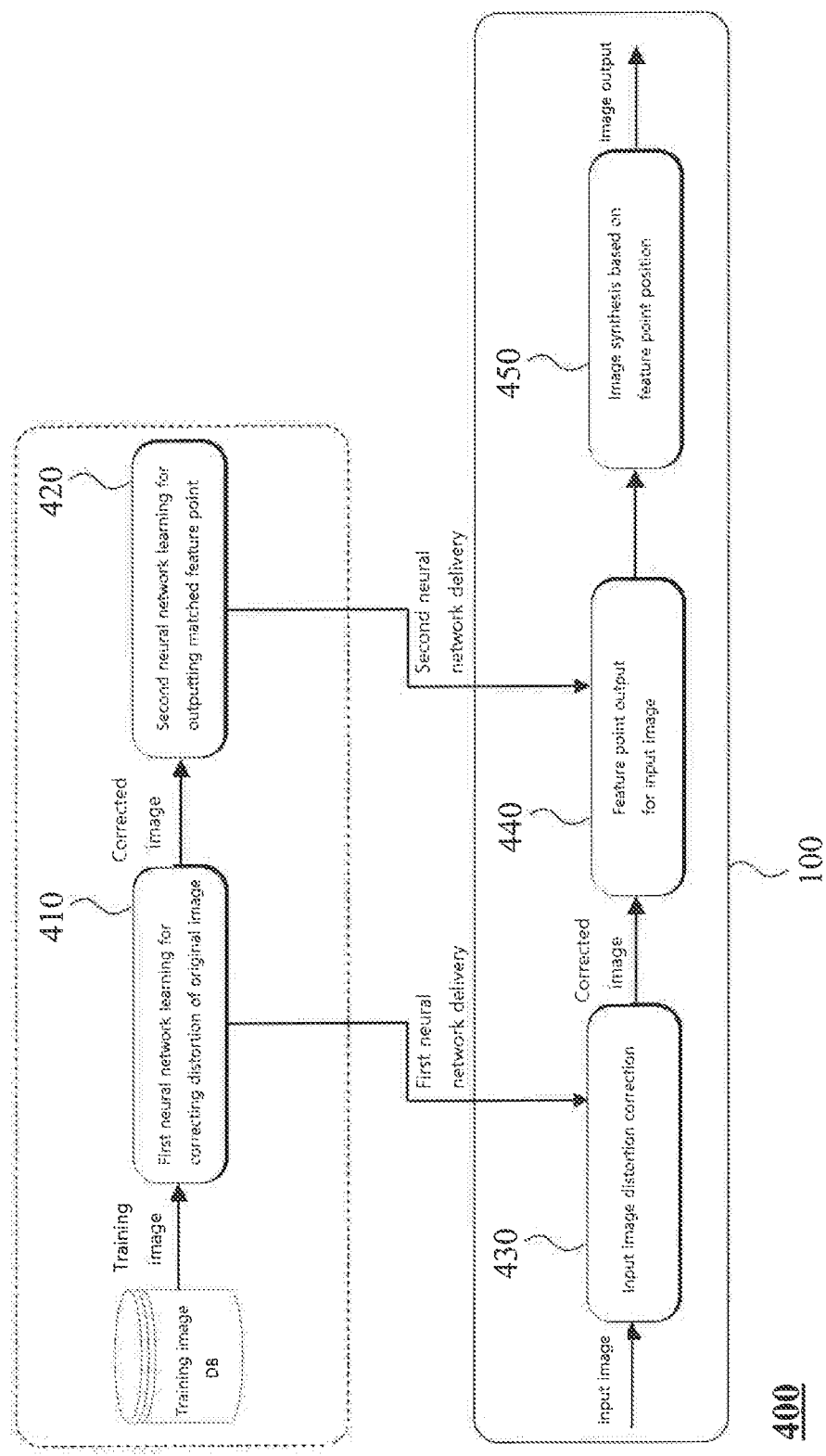
FIG. 9 is another example of a process for providing an around view image.

FIG. 9 is another example of a process 400 for providing an around view image. The computer device inputs the training image to the first artificial neural network. The first artificial neural network is to correct the distortion existing in the original image before generating the feature vector from the image. For this, the computer device learns the first artificial neural network using the distorted original image as an input and the corrected image as an output (410). The distortion correction may be a process of correcting distortion of a fisheye lens image as described above. The first neural network is a neural network that receives images and generates images. Accordingly, the first neural network may have the same structure as an auto encoder or a convolutional encoder-decoder.

The computer device inputs the corrected image outputted by the first neural network to the second neural network so that the second neural network learns to output the feature vector (420). The second neural network may have the same structure as a CNN that receives an image and outputs a feature vector.

The image processing device receives the first neural network and the second neural network. The image processing device inputs images obtained by a plurality of cameras placed on a car into the first artificial neural network. The first artificial neural network may exist separately for a plurality of images. The first artificial neural network 430 outputs an image corrected for distortion (430). The image processing device inputs the corrected image to the second neural network and outputs a feature vector for a plurality of images (440). At this time, the second artificial neural network may exist separately for a plurality of images. The image processing device may find matched feature points in the adjacent images among the plurality of images based on the feature vectors of the plurality of images (450). The image processing device can use any one of a variety of algorithms for finding matched feature points in an image processing field. The image processing device can match images based on feature points matching each other in adjacent images. The image processing device generates a composite image based on the matched image (450).

Figure 10:
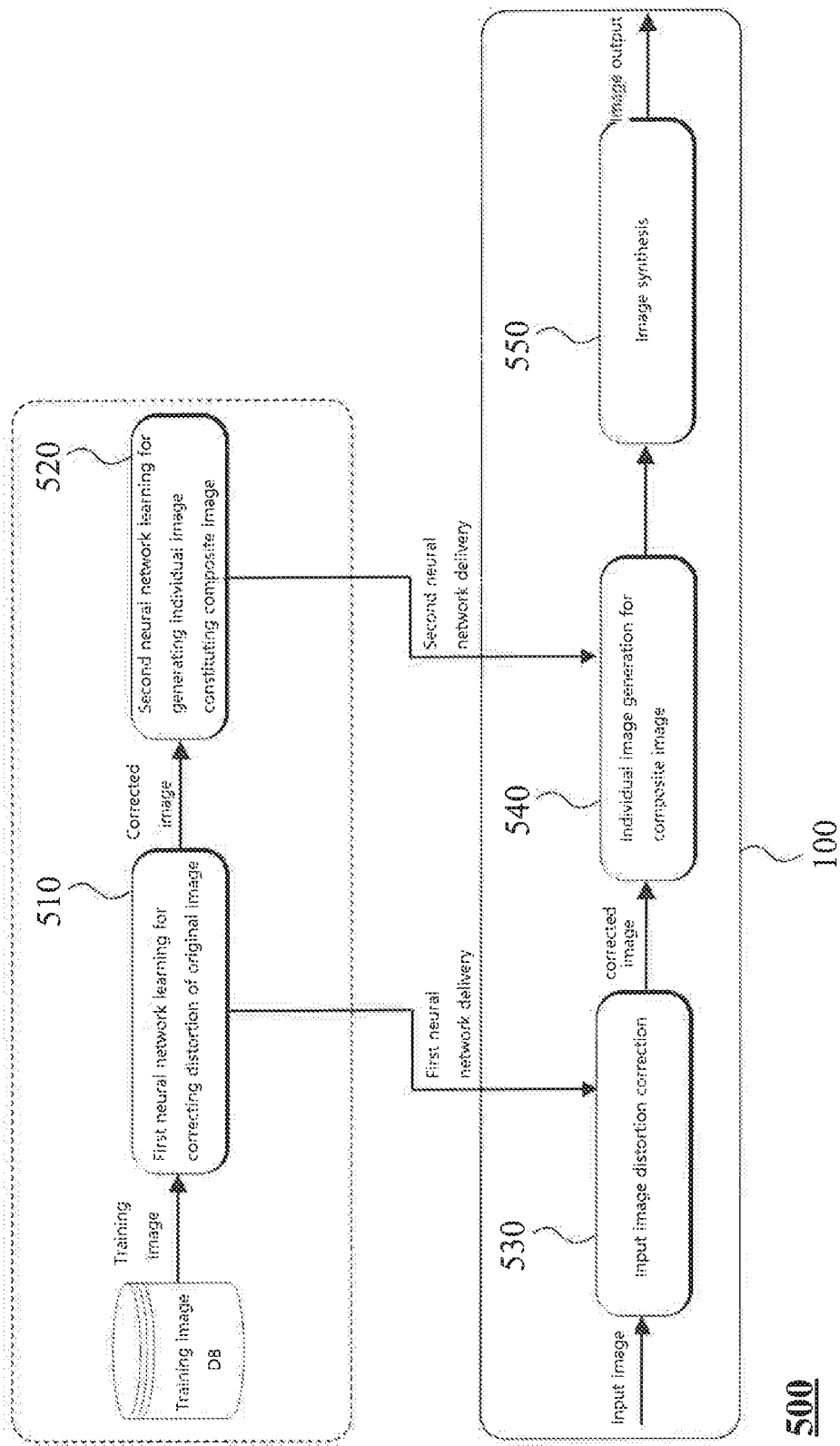
FIG. 10 is another example of a process for providing an around view image.

FIG. 10 is another example of a process 500 for providing an around view image. The computer device inputs the training image to the first artificial neural network. The first artificial neural network is to correct the distortion existing in the original image before generating the feature vector from the image. For this, the computer device learns the first artificial neural network using the distorted original image as an input and the corrected image as an output (510). The distortion correction may be a process of correcting distortion of a fisheye lens image as described above. The first neural network is a neural network that receives images and generates images. Accordingly, the first neural network may have the same structure as an auto encoder or a convolutional encoder-decoder.

The computer device inputs the corrected image outputted by the first neural network to the second neural network so that the second neural network learns to outputs an individual image constituting the composite image (520). Unlike FIG. 9, FIG. 10 corresponds to a model in which a second neural network generates an image. Accordingly, the second neural network may have the same structure as an auto encoder or a convolutional encoder-decoder.

The image processing device receives the first neural network and the second neural network. The image processing device inputs images obtained by a plurality of cameras placed on a car into the first artificial neural network. The first artificial neural network may exist separately for a plurality of images. The first artificial neural network outputs an image corrected for distortion (530). The image processing device inputs the corrected image to the second neural network and generates an individual image constituting the composite image (540). Individual images typically have the same number of cameras. At this time, the second artificial neural network may exist separately for a plurality of images. The image processing device synthesizes a plurality of individual images outputted from the second artificial neural network into one image (550). The position of an individual image in the composite image can be determined according to the type (identified by the camera ID or the camera position) of the first input image.

An artificial neural network that receives images and outputs different images will be further described.

Auto Encoder

The auto encoder includes an encoder and a decoder. The auto encoder is widely used for unsupervised learning. An encoder provides a latent variable as an output when input data x is received. The latent variable can be used as a feature vector of input x. The decoder uses the prediction value formed from the latent variable as output.

Convolutional Encoder/Decoder

Figure 11:
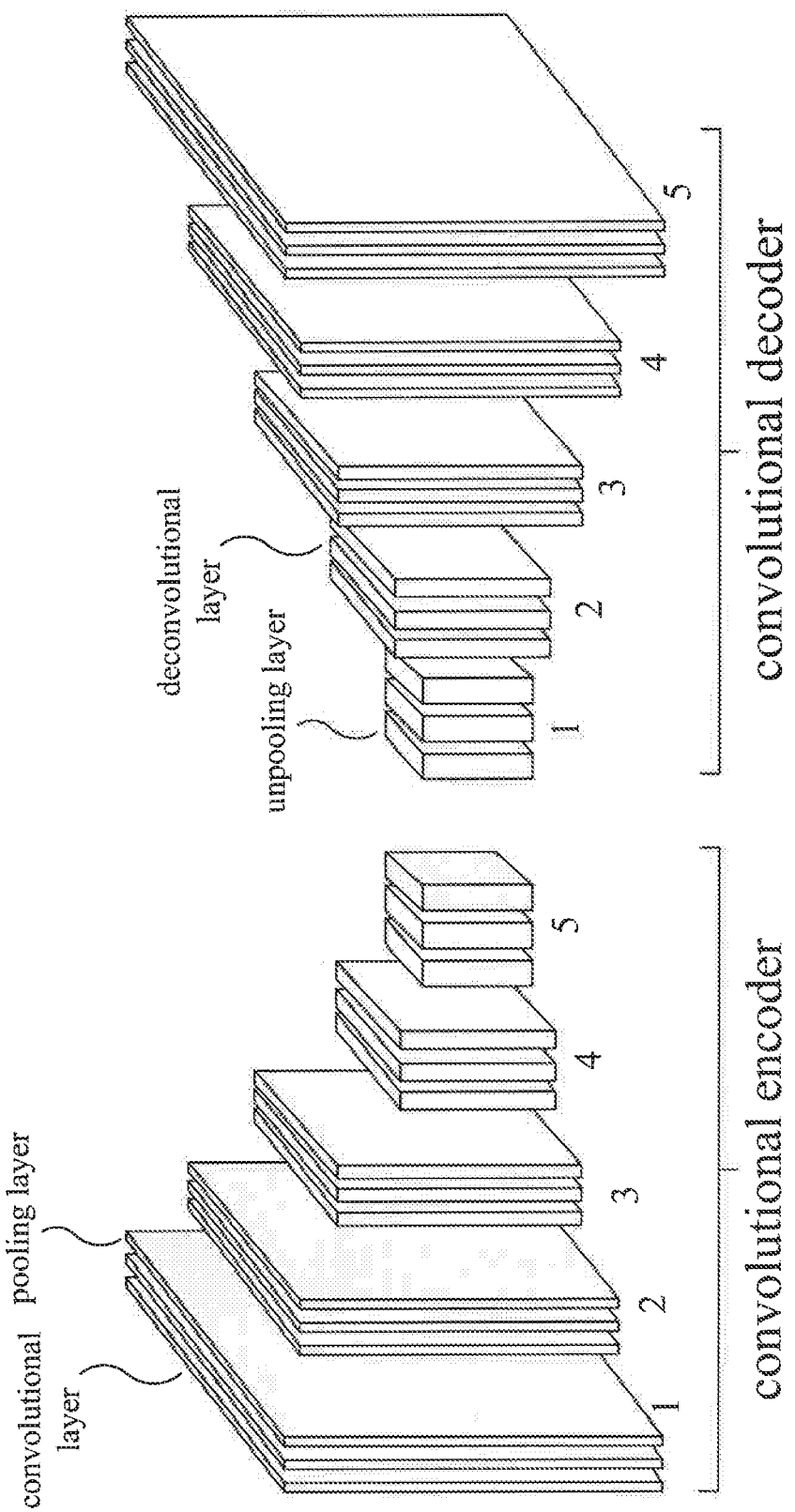
FIG. 11 is an example of a convolutional encoder-decoder.

FIG. 11 is an example of a convolutional encoder-decoder. The convolutional encoder-decoder consists of a convolutional encoder and a convolutional decoder. The convolutional encoder-decoder is a network structure consisting of a pair of a convolutional layer and a deconvolutional layer. FIG. 11 shows a structure having five convolutional layers and five deconvolutional layers. The convolutional encoder includes a convolutional layer and a pooling layer. The deconvolutional layer includes a deconvolutional layer and an unpooling layer.

The deconvolutional layer performs the inverse operation of the convolutional layer. The deconvolutional layer performs a convolution operation in the opposite direction to the convolutional layer. The deconvolutional layer receives the feature map as input and generates an output image through a convolution operation using the kernel. If stride is set to 1, the deconvolutional layer outputs the image in which the horizontal and vertical size of the feature map are identical to the horizontal and vertical of output. If stride is set to 2, the deconvolutional layer outputs a half-sized image as compared to the horizontal and vertical size of the feature map.

The unpooling layer performs upsampling in the opposite direction of the pooling layer. Unlike the pooling layer, the unpooling layer plays a role to extend the dimension. For example, contrary to FIG. 6, the unpooling layer can upsample one sample to a 2×2 window.

The convolutional encoder-decoder provides an input-feature vector-output similar to an auto encoder. However, unlike an auto encoder, in relation to a convolutional encoder-decoder, the convolutional encoder outputs the feature map for the input image, and the convolutional decoder outputs the image for the received feature map.

Figure 12:
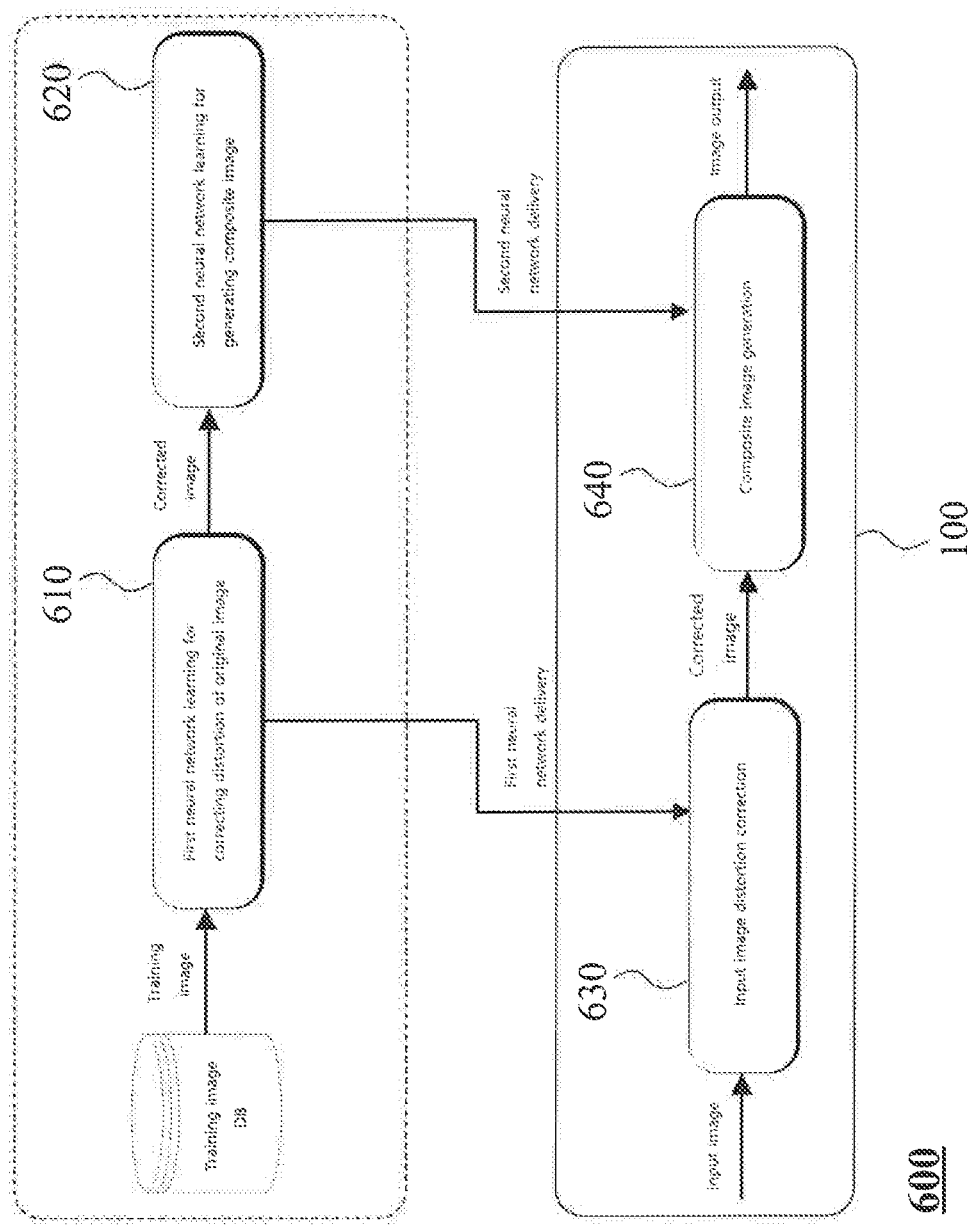
FIG. 12 is another example of a process for providing an around view image.

FIG. 12 is another example of a process for providing an around view image. The computer device inputs the training image to the first artificial neural network. The first artificial neural network is to correct the distortion existing in the original image before generating the feature vector from the image. For this, the computer device learns the first artificial neural network using the distorted original image as an input and the corrected image as an output (610). The distortion correction may be a process of correcting distortion of a fisheye lens image as described above. The first neural network is a neural network that receives images and generates images. Accordingly, the first neural network may have the same structure as an auto-encoder or a convolutional encoder-decoder.

The computer device inputs the corrected image outputted by the first neural network to the second neural network so that the second neural network learns to output the composite image (620). Unlike FIG. 10, FIG. 12 corresponds to a model in which a second neural network generates a composite image. Accordingly, the second neural network may have the same structure as an auto-encoder or a convolutional encoder-decoder.

The image processing device receives the first neural network and the second neural network. The image processing device inputs images obtained by a plurality of cameras placed on a car into the first artificial neural network. The first artificial neural network may exist separately for a plurality of images. The first artificial neural network outputs an image corrected for distortion (630). The image processing device inputs the corrected image to the second neural network and generates a composite image (640). The second artificial neural network has a structure that processes a plurality of images at once.

Figure 13:
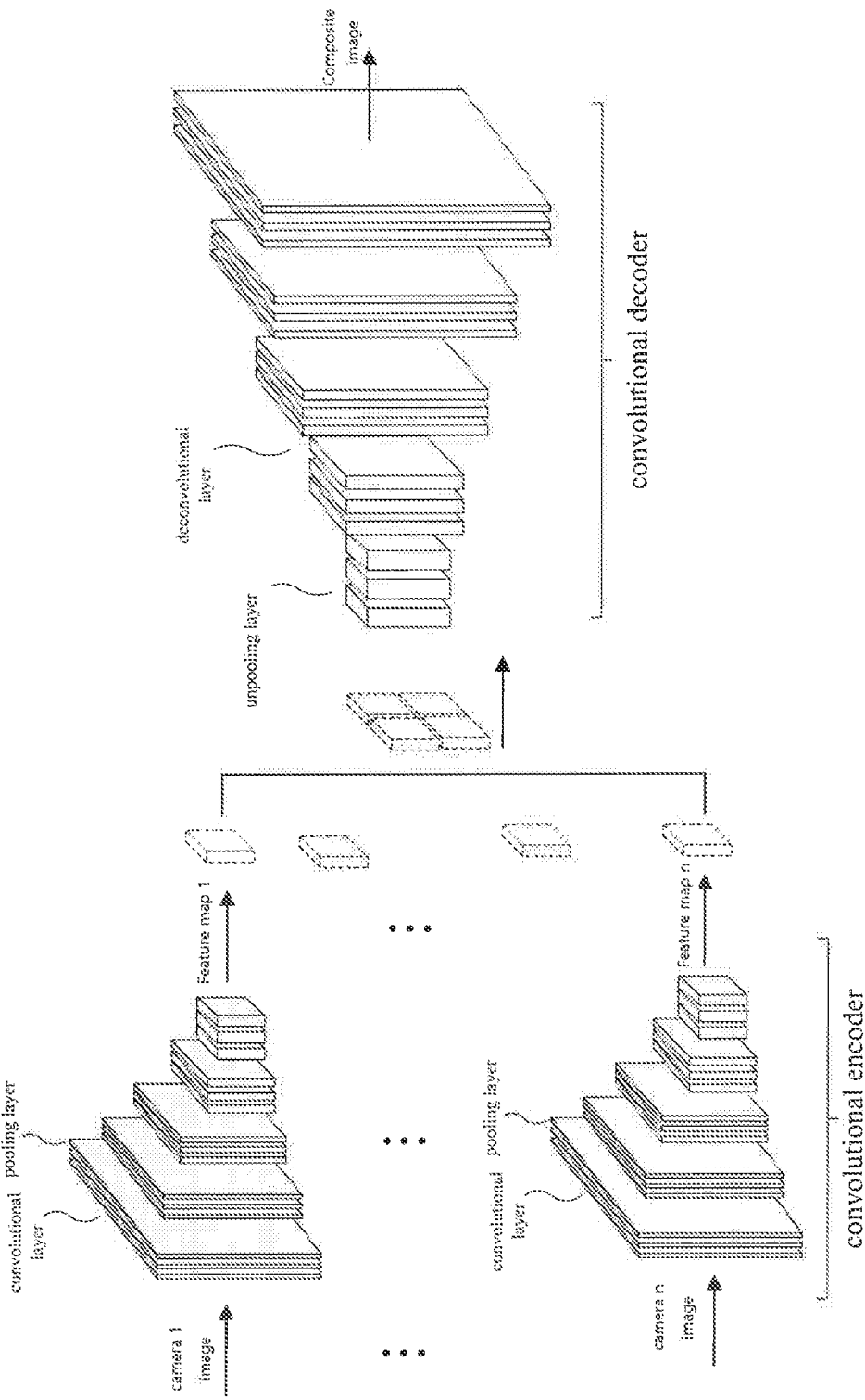
FIG. 13 shows an example of an image generation network.

FIG. 13 shows an example of an image generation network. The second artificial neural network described with reference to FIG. 12 may have the same structure as the image generation network of FIG. 13. The image generation network includes a convolutional encoder and a convolutional decoder.

Depending on the number of images to be processed as in FIG. 13, a plurality of convolutional encoders may be provided in advance. FIG. 13 shows a convolutional encoder for processing n camera images individually. Here, n is a natural number. Each convolutional encoder generates a feature map for the inputted image. Therefore, the convolutional encoder generates n feature maps as many as the total number of input images.

Thereafter, the image processing device must regularly reconfigure n feature maps. The image processing device can reconfigure the feature map considering the positions occupied by the individual images captured by each camera in the around view image. The image processing device can reconfigure n feature maps as if the n feature maps were arranged as one feature map.

The convolutional decoder receives n feature maps or a feature map in which n feature maps are reconfigured as one feature map. The convolutional decoder upsamples the feature map, deconvolutes the feature map, and finally generates one composite image. At this time, matching for each individual image may be performed. A convolutional decoder can use a filter (kernel) for matching individual images. At this time, the weights applied to the filter are prepared through the learning process.

Figure 14:
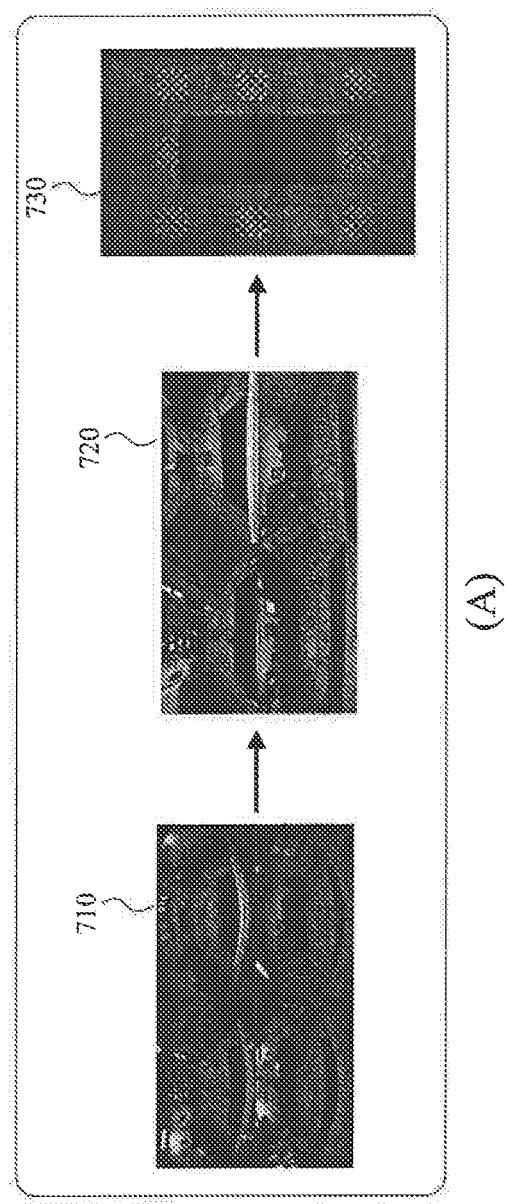
FIG. 14 is an example of a process for generating an around view image.
Figure 14:
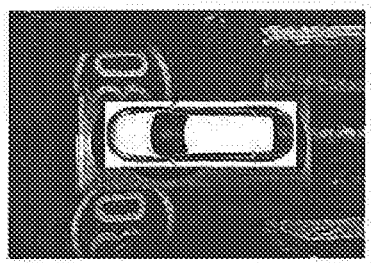

FIG. 14 is an example of a process for generating an around view image. FIG. 14(A) corresponds to a process in which an actual individual image is generated as an around view image. The image processing device obtains the original image obtained by a plurality of cameras (710). FIG. 14 corresponds to the case where there are four cameras. The original image is taken with a fisheye lens and there is a certain distortion. The image processing device may correct the distortion of each original image (720). The image processing device can perform the correction process using the artificial neural network as described above. The image processing device can generate a composite image corresponding to the around view image based on the corrected image (730). The image processing device may use any of the various embodiments for generating composite images. Here, the embodiment may be any one of the examples described with reference to FIG. 9, FIG. 10, or FIG. 12.

FIG. 14(B) is an example of an around view image outputted from a display device of a car. An around view image outputted by the image processing device to the display device is basically an image at the top view as shown in FIG. 14(B). Furthermore, the image processing device can generate and output images with different viewpoints from the top view. For example, an image processing device can generate an image at a bird's view. The image processing device may use different machine learning models (e.g., artificial neural networks) at different viewpoints. In this case, the machine learning model should be learned in advance with different models depending on the viewpoint. Alternatively, the weight (parameter) applied to any one of the previously prepared models (for example, a top view) is changed to be constant so that it is possible to generate an image corresponding to another viewpoint (e.g., a bird's view).

In addition, the above-described around view image generating method may be implemented using a program (or an application) including an executable algorithm that can be executed in a computer. The program may be stored in a nontransitory computer readable medium and provided.

The technique described below uses a machine learning model for matching images, so that the camera need not be calibrated in the manufacturing process. Further, when using the technique described below, since the captured images during the driving process of a car are generated by analyzing the images in real time, the deterioration of the image quality due to aging does not occur.

A nontransitory computer readable medium is not a medium that stores data for short moments, such as registers, caches, memories, etc., but means a medium that stores data semi-permanently and is readable by a device. Specifically, the various applications or programs described above may be stored in a nontransitory computer readable medium such as CD, DVD, hard disk, Blu-ray disk, USB, memory card, ROM, and the like.

The present embodiment and the drawings attached to the specification are only a part of the technical idea included in the above described technology, and within the scope of the technical idea included in the specification and the drawings of the above-mentioned technology, it will be apparent that modification examples and specific embodiments which can readily be devised by those skilled in the art are included in the above-mentioned technical scope.

What is claimed is:

1. An automotive around view image providing method using a machine learning model, the method comprising:
   receiving, by an image processing device, a plurality of images obtained by a plurality of cameras mounted on a car;
   inputting, by the image processing device, the plurality of images to a neural network encoder to generate a feature vector for each image in the plurality of images; and
   combining, by the image processing device, the feature vectors for the plurality of images into one image form and inputting the one image form to a neural network decoder to generate a matched one image,
   wherein the neural network decoder comprises a filter for performing matching on adjacent images having an overlapping area among the plurality of images based on the feature vectors for the plurality of images.

2. The method of claim 1, further comprising inputting, by the image processing device, the plurality of images to an image correction network to generate an image in which distortion is corrected for each image in the plurality of images,
   wherein the distortion-corrected image is inputted to the neural network encoder.

3. The method of claim 1, wherein the neural network encoder is a deep learning network comprising of a convolutional layer and a pooling layer,
   wherein the neural network decoder is a deep learning network comprising of an unpooling layer and a deconvolutional layer.

4. The method of claim 1, wherein the neural network encoder is provided in plurality to process the plurality of images,
   wherein the image processing device arranges the plurality of feature vectors outputted from the plurality of neural network encoders at predetermined positions to combine into one feature vector.

5. An automotive around view image providing method using a machine learning model, the method comprising:
   receiving, by an image processing device, a plurality of images obtained by a plurality of cameras mounted on a car;
   inputting, by the image processing device, the plurality of images to a neural network encoder to generate a feature vector for each image in the plurality of images;
   matching, by the image processing device, adjacent images based on a feature vector extracted from the adjacent images having an overlapping area among the plurality of images; and
   synthesizing, by the image processing device, the matched adjacent images into one image.

6. The method of claim 5, further comprising inputting, by the image processing device, the plurality of images to an image correction network to generate an image in which distortion is corrected for each image in the plurality of images, wherein the distortion-corrected image is inputted to the neural network encoder.

7. The method of claim 5, wherein the neural network encoder is a deep learning network comprising of a convolutional layer and a pooling layer.

8. An image processing device for generating an around view image using a machine learning model, the image processing device comprising:
   a communication device configured to receive a plurality of images obtained by a plurality of cameras mounted on a car;
   a memory configured to store an image generation network model including a convolutional encoder and a convolutional decoder; and
   a processor configured to:
   input the plurality of images to the convolutional encoder to generate a feature vector for each image in the plurality of images, and
   combine the feature vectors for the plurality of images into one image form and inputting the one image form to the convolutional decoder to generate a matched one image,
   wherein the convolutional decoder comprises a filter for performing matching on adjacent images having an overlapping area among the plurality of images based on the feature vectors for the plurality of images.

9. The device of claim 8, wherein the memory is configured to store an image correction network model for correcting distortion for at least one image of the plurality of images,
   wherein the processor is configured to input a correction image, which is generated by inputting the plurality of images into the image correction network model, into the convolutional encoder.

10. The device of claim 8, wherein the convolutional encoder is a deep learning network comprising of a convolutional layer and a pooling layer,
    wherein the convolutional decoder is a deep learning network comprising of an unpooling layer and a deconvolutional layer.

11. The device of claim 8, wherein the convolutional encoder is provided in plurality to process the plurality of images,
    wherein the processor is configured to arrange the plurality of feature vectors outputted from the plurality of convolutional encoders at predetermined positions to combine into one feature vector, and is configured to input the one feature vector into the convolutional decoder.

12. A non-transitory computer-readable medium storing computer instructions therein, which when executed by a processor in the image processing device performs the method for providing the automotive around view image using the machine learning model according to claim 1.

13. A non-transitory computer-readable medium storing computer instructions therein, which when executed by a processor in the image processing device performs the method for providing the automotive around view image using the machine learning model according to claim 2.

14. A non-transitory computer-readable medium storing computer instructions therein, which when executed by a processor in the image processing device performs the method for providing the automotive around view image using the machine learning model according to claim 3.

15. A non-transitory computer-readable medium storing computer instructions therein, which when executed by a processor in the image processing device performs the method for providing the automotive around view image using the machine learning model according to claim 4.

\* \* \* \* \*